Feb. 19, 1929.
C. R. LION
1,702,944
AUTOMATIC SEWER FLUSHER
Filed June 20, 1927
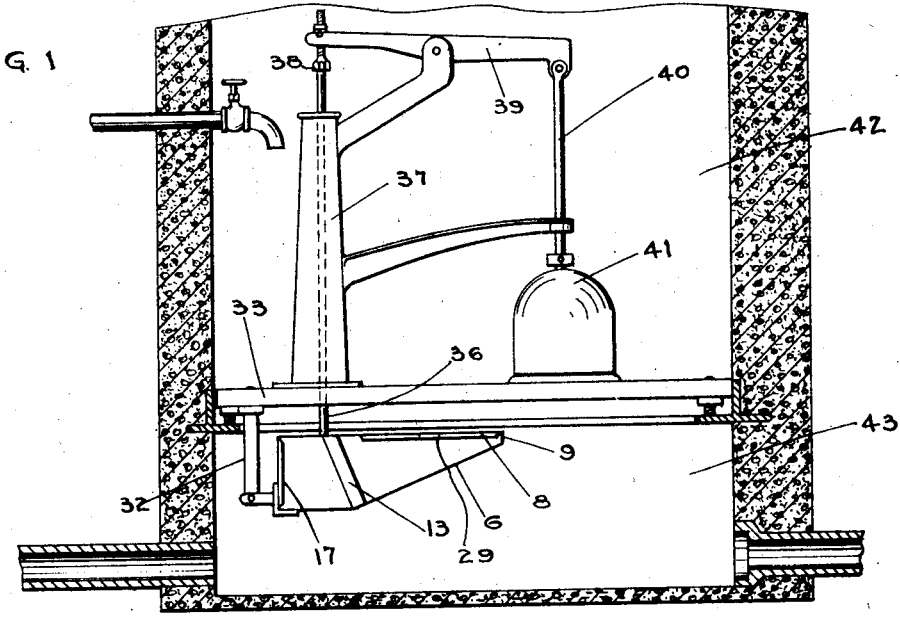
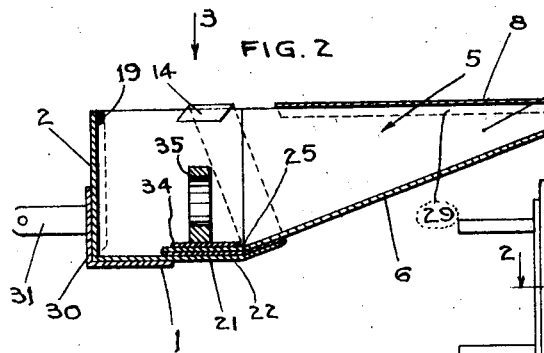
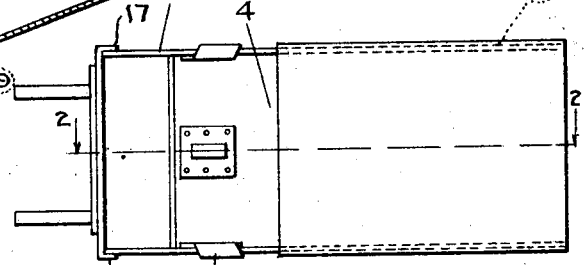
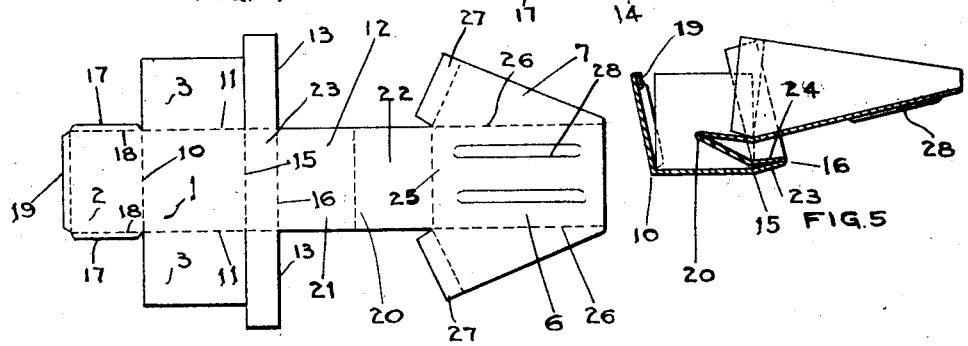
INVENTOR
C. R. LION
BY
Hazard and Miller
ATTORNEYS Patented Feb. 19, 1929.

1,702,944

UNITED STATES PATENT OFFICE.

CHARLES R. LION, OF LOS ANGELES, CALIFORNIA.

AUTOMATIC SEWER FLUSHER.

Application filed June 20, 1927. Serial No. 200,036.

My invention is in connection with an automatic sewer flusher and has to do with a flushing pan construction and the manner of making same.

An object of my invention is the construction particularly of a flushing pan for use with an automatic sewer flusher, in which the pan is formed of sheet metal, this being cut out of a flat blank, being folded on various lines in order to form when riveted or soldered a water tight can sufficiently reinforced for the purpose in hand.

Another object of my invention is the particular manner of folding the sheet metal to form a reinforced base or bottom for the pan.

The type of pan used in the flusher has a rectangular open body portion which is adapted to be positioned directly under a flushing column and to be filled with water discharging from said column. One side has a spout connected thereto, the spout being the full depth of the side, and having a lower surface gradually inclined upwardly. In making such a pan I cut a piece of sheet metal so as to form the bottom, the back and two sides of the body portion, and have an elongated strip which, when folded, forms a reinforcement for the base or bottom and also the spout. The two sides of the spout fold upwardly and form the sides of the spout. A pair of straps forming an integral part of the sheet metal strip are carried up from the lower part of the spout over the upper edge of the side walls, thereby bracing the spout. The top of the spout is covered by an additional cover plate.

My invention will be more readily understood from the following description and drawings, in which:

Figure 1 is an elevation of a sewer flusher with my pan installed therein, the manhole and well being shown in section.

Figure 2 is a longitudinal section of the pan on the line 2—2 of Fig. 3.

Figure 3 is a plan view of the pan taken in the direction of the arrow 3 of Fig. 2.

Figure 4 is a plan of a blank cut to shape and showing the folding lines for forming the major part of the pan.

Figure 5 is a longitudinal section showing the pan partly folded, illustrating one step in the operation of making.

The main details of the pan are substantially as follows, having reference particularly to Figs. 2 and 3:

The pan has a base 1, a back 2, side walls 3, and is open at the side 4, to which is connected the spout 5. This spout has a bottom inclined plate 6 and opposite sides 7. An extra cover plate 8 covers the major part of the spout leaving a discharge orifice 9.

The manner of making the pan is substantially as follows, referring particularly to Figs. 4 and 5, in which:

A flat base of sheet metal is illustrated cut to shape and having lines showing the manner of folding. The sheet has a center portion which forms the base 1, the back wall 2, the side walls 3, these parts being so designated on Fig. 4 of the drawing. Line 10 indicating a bend shows the line on which the back is bent upwardly with reference to the base or bottom, and the lines 11 the bending lines for the sides with reference to the bottom. A tongue portion 12 extends from the base or bottom 1 and has two straps 13 cut, the straps being beside the side walls 3, and when folded upwardly occupying the position indicated in Figs. 1 and 2, with the free ends 14 of the straps bent over the inside of the side walls. The dotted line 15 indicates a bending line to give the incline for the bottom of the spout and the line 16 a reverse fold, these being indicated in Fig. 5. The back wall 2 has side strips 17 which are bent over on the line 18 to engage the sides of the pan as indicated by the numeral 17, and an end strip 19 is folded inwardly at the top of the back.

The dotted line 20 indicates a reverse fold, as shown in Fig. 5, so that when the pan is folded in shape and made up there is a portion 21 of the tongue 12 resting directly on the the bottom and the reversely folded section 22 of the tongue extending towards the spout, the bottom 6 of the spout being inclined upwardly as above mentioned, and being braced by the lower part 23 of the strap 13 and by the reverse bent portion 24 of the portion 21. The dotted line 25 indicates the fold of the bottom 6 of the spout adjacent the open end of the body portion of the pan. The side walls 7 of the pan are folded upwardly along the lines 26, these sides having projecting ends 27 which fit on the outside of the side walls 3. After the pan is folded into the shape shown in Fig. 2, rivets are inserted through the over-lapping parts and through the folded parts and subsequently these parts are folded or brazed to give a water tight joint. Any other procedure may be followed in attaching the folding parts firmly in position and the over-lapping parts firmly together.

The spout has longitudinal corrugations 28 for the purpose of strengthening, and the cover 8 has downwardly extending side flanges 29 which are folded or otherwise secured to the top of the side walls 7 of the spout. This structure makes up the body portion of the spout and when completed gives a water tight structure reinforced on the base or bottom and having reinforcing straps supporting the spout.

An angle 30 is secured to the back and bottom or base of the pan and has arms 31 which extend rearwardly therefrom, these arms being pivotally connected to a bracket 32, the bracket being secured to the floor 33, on which the flushing mechanism is mounted.

A plate 34 is secured in the base of the pan, being placed on top of the overlapping parts 21 and 22, this having an enlarged eye 35 in which the pan operated rod 36 connects.

The plate 34 which is connected with the enlarged eye 35 is riveted through the double folded tongue 12 having the parts 21 and 22. Thus the plate 34 adds to the stiffness of the folded sections of the bucket.

This rod extends upwardly through the flushing column 37, and by means of a swivel rod 38 is connected to the rocking lever 39. This lever has a stem 40 connected thereto, to which is attached a valve bell 41, such parts being common to the type of flusher illustrated, this flusher being made substantially in accordance with the main features of the patent to Garrie H. Burns, No. 1,256,656, issued February 19, 1918.

The manner of operation of the flusher may be recited as follows:

The manhole 42 is filled with water by a constant charging pipe and when the water reaches the top of the flushing column it overflows into a pan until the pan receives a sufficient weight to tilt same, and in the tilting of the pan the pan operated rod 36 is drawn downwardly, thus rocking the lever 39, which raises the bell valve 41, allowing the manhole to flush into the well 43 and such water to wash down into the sewer. It will be seen, therefore, that the pan is located in an inaccessible position, requiring the taking out of the floor and the flushing mechanism to renew or repair the pan, hence it is desirable to have a sheet metal pan sufficiently reinforced in order to withstand the jolting stresses of dumping the water and returning to its normal position. It is found that a sheet metal pan, made in accordance with my invention, has sufficient strength for ordinary purposes and when properly made will withstand rust for a sufficiently long time, thus effecting economy in construction and maintenance over the present practice using other types of pans.

Various changes may be made in the principles of my invention without departing from the spirit thereof, as set forth in the description, drawings and claims.

I claim:

1. A pan for an automatic sewer flusher having a sheet metal base, back and side walls, and being open on one side, a spout having an inclined plate and sides connected to the base and the side walls respectively, and a strap reinforcing the spout extending underneath the inclined plate and over the top edge of the side walls.

2. A pan for an automatic sewer flusher having a body part formed of sheet metal with a base, opposite side walls and a back, a spout having an inclined plate connected to the base by a fold of sheet metal, sides extending upwardly from the inclined plate and secured to the side walls of the body portion, and a strap extending underneath the inclined plate and over the top edges of the said side walls.

3. A pan for an automatic sewer flusher having a body portion formed of sheet metal, the metal being cut and bent to form a base, opposite side walls and a back, the body portion being open opposite the back, a tongue extending from the base having a fold against the base, an inclined plate extending upwardly from the fold, and sides integral with the plate, the said sides having projecting ends secured to the side walls.

4. A pan for an automatic sewer flusher formed of sheet metal, having a base, a pair of opposite side walls bent upwardly from the base, a back bent upwardly from the end of the base, a tongue extending in an opposite direction having a double reverse fold, and an inclined plate extending from said fold, said plate having integral sides with projecting ends, the projecting ends being secured to the said side walls.

5. A pan for an automatic sewer flusher, as claimed in claim 4, a pair of straps formed integral with the tongue, having a cut separating same from the side walls, the tongue being bent upwardly passing across the sides of the spout and over the top of the said side walls of the body portion.

6. A pan for an automatic sewer flusher formed of sheet metal, having a rectangular base, rectangular opposite side walls bent upwardly therefrom, and a rectangular back wall also bent upwardly from the base, the back wall and sides being joined at a pair of corners, a top portion extending from the base and having double reverse folds over the base, an inclined plate forming a continuation of the tongue, said plate having integral sides with projecting ends, the projecting ends being secured to the said side walls, a strap formed integral with the tongue bent upwardly over the said sides on the upper edge of the said side walls, and a cover plate over part of the spout, said cover being connected to the sides of the spout and leaving a discharge orifice at the end of the inclined plate.

7. A pan for an automatic sewer flusher, as claimed in claim 6, and a plate having an eye secured to the inside of the pan, said plate being positioned on the double fold of the tongue and riveted through the said tongue thereby binding the folds of said tongue.

8. A blank for a pan for an automatic sewer flusher, said blank comprising an elongated strip of sheet metal having one end part to bend upwardly and form a back, two side parts to bend upwardly and form side walls, a tongue portion, the other end of the strip being connected to the tongue to form an inclined plate, sides connected to the last mentioned end, and a strap connected to the tongue.

In testimony whereof I have signed my name to this specification.

CHARLES R. LION.